United States Patent
Kasaba et al.

(10) Patent No.: US 8,814,402 B2
(45) Date of Patent: Aug. 26, 2014

(54) CONTROL DEVICE FOR VEHICLE LAMP AND VEHICLE LAMP SYSTEM

(75) Inventors: Yusuke Kasaba, Shizuoka (JP); Masashi Yamazaki, Shizuoka (JP); Atsushi Toda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 105 days.

(21) Appl. No.: 13/449,525

(22) Filed: Apr. 18, 2012

(65) Prior Publication Data

US 2012/0268958 A1 Oct. 25, 2012

(30) Foreign Application Priority Data

Apr. 22, 2011 (JP) ................................. 2011-096573

(51) Int. Cl.
*F21V 1/00* (2006.01)

(52) U.S. Cl.
USPC ........... 362/466; 362/460; 362/461; 362/462; 362/463; 362/464; 362/465; 362/467; 362/468

(58) Field of Classification Search
USPC ................................................. 362/459–549
See application file for complete search history.

(56) References Cited

U.S. PATENT DOCUMENTS

| 5,787,370 A * | 7/1998 | Kutscher et al. ............... 362/465 |
| 6,430,521 B1 | 8/2002 | Toda |
| 2003/0076045 A1 | 4/2003 | Toda et al. |
| 2004/0125608 A1 * | 7/2004 | Izawa ............................ 362/464 |

FOREIGN PATENT DOCUMENTS

| DE | 199 08 482 A1 | 9/2000 |
| JP | 2000-085459 | 3/2000 |
| JP | 2001-341578 | 12/2001 |
| JP | 2004-314856 | 11/2004 |
| JP | 2009-126268 | 6/2009 |

OTHER PUBLICATIONS

European Patent Office, Search Report for Appln. No. 12160584.4 (dated Jan. 25, 2013).

* cited by examiner

*Primary Examiner* — William Carter
(74) *Attorney, Agent, or Firm* — Fish & Richardson P.C.

(57) ABSTRACT

A control device (100) for controlling a vehicle lamp (210) provided in a vehicle is provided. The device includes: a receiver (102) configured to receive an acceleration signal representing an acceleration of the vehicle, from an acceleration sensor configured to detect the acceleration of the vehicle, wherein an inclination angle ($\theta$) of the vehicle with respect to a horizontal plane is calculated based on the acceleration signal; a controller (104) configured to: i) generate a first control signal instructing the vehicle lamp to adjust an optical axis of the vehicle lamp in response to a change of the acceleration signal, when the vehicle has already stopped; and ii) generate a second signal instructing the vehicle lamp to maintain the optical axis of the vehicle lamp, when the vehicle is traveling on a road surface.

4 Claims, 6 Drawing Sheets

CONTROL DEVICE FOR VEHICLE LAMP AND VEHICLE LAMP SYSTEM

This application claims priority from Japanese Patent Application No. 2011-096573, filed on Apr. 22, 2011, the entire contents of which are hereby incorporated by reference.

BACKGROUND

1. Technical Field

The present disclosure relates to a control device for a vehicle lamp and a vehicle lamp system

2. Related Art

Automatic leveling control, which changes an irradiation direction by automatically adjusting the position of an optical axis of a vehicle headlight according to an inclination angle of a vehicle, has been known. Generally, in automatic leveling control, a vehicle height sensor is used as an inclination detector of a vehicle and the position of an optical axis of a headlight is adjusted on the basis of a pitch angle of a vehicle that is detected by the vehicle height sensor. Meanwhile, a structure, which performs automatic leveling control using an acceleration sensor as an inclination detector, is disclosed in JP-A-2000-085459, JP-A-2004-314856, JP-A-2001-341578 and JP-A-2009-126268, for example.

If an acceleration sensor is used as an inclination detector of a vehicle, it is possible to reduce the manufacturing cost and weight of an automatic leveling system as compared to a case where a vehicle height sensor is used. Meanwhile, there is a demand for automatic leveling control that is performed with a higher accuracy through the reduction of a detection error or the like of the sensor even when an acceleration sensor is used.

SUMMARY OF THE INVENTION

Exemplary embodiments of the present invention may address the above disadvantages and other disadvantages not described above. However, the present invention is not required to overcome the disadvantages described above, and thus, an exemplary embodiment of the present invention may not overcome any disadvantages.

One or more illustrative aspects of the present invention is to provide a technique that improves the accuracy of automatic leveling control for adjusting an optical axis of a vehicle lamp by an acceleration sensor.

According to one or more illustrative aspects of the present invention, there is provided a control device (100) for controlling a vehicle lamp (210) provided in a vehicle, the device comprising: a receiver (102) configured to receive an acceleration signal representing an acceleration of the vehicle, from an acceleration sensor configured to detect the acceleration of the vehicle, wherein an inclination angle (θ) of the vehicle with respect to a horizontal plane is calculated based on the acceleration signal; a controller (104) configured to: i) generate a first control signal instructing the vehicle lamp to adjust an optical axis of the vehicle lamp in response to a change of the acceleration signal, when the vehicle has already stopped; and ii) generate a second signal instructing the vehicle lamp to maintain the optical axis of the vehicle lamp, when the vehicle is traveling on a road surface.

According to one or more illustrative aspects of the present invention, there is provided a vehicle lamp system. The vehicle lamp system includes: a vehicle lamp (210) provided in a vehicle and configured to adjust an optical axis thereof; an acceleration sensor (110) configured to detect the acceleration of the vehicle; and a control device (100) configured to control the vehicle lamp. The control device includes: a receiver (102) configured to receive an acceleration signal representing an acceleration of the vehicle, from the acceleration sensor, wherein an inclination angle (θ) of the vehicle with respect to a horizontal plane is calculated based on the acceleration signal; a controller (104) configured to: i) generate a first control signal instructing the vehicle lamp to adjust the optical axis of the vehicle lamp in response to a change of the acceleration signal, when the vehicle has already stopped; and ii) generate a second signal instructing the vehicle lamp to maintain the optical axis of the vehicle lamp, when the vehicle is traveling on a road surface.

Other aspects and advantages of the present invention will be apparent from the following description, the drawings and the claims.

DETAILED DESCRIPTION

Figure 1:
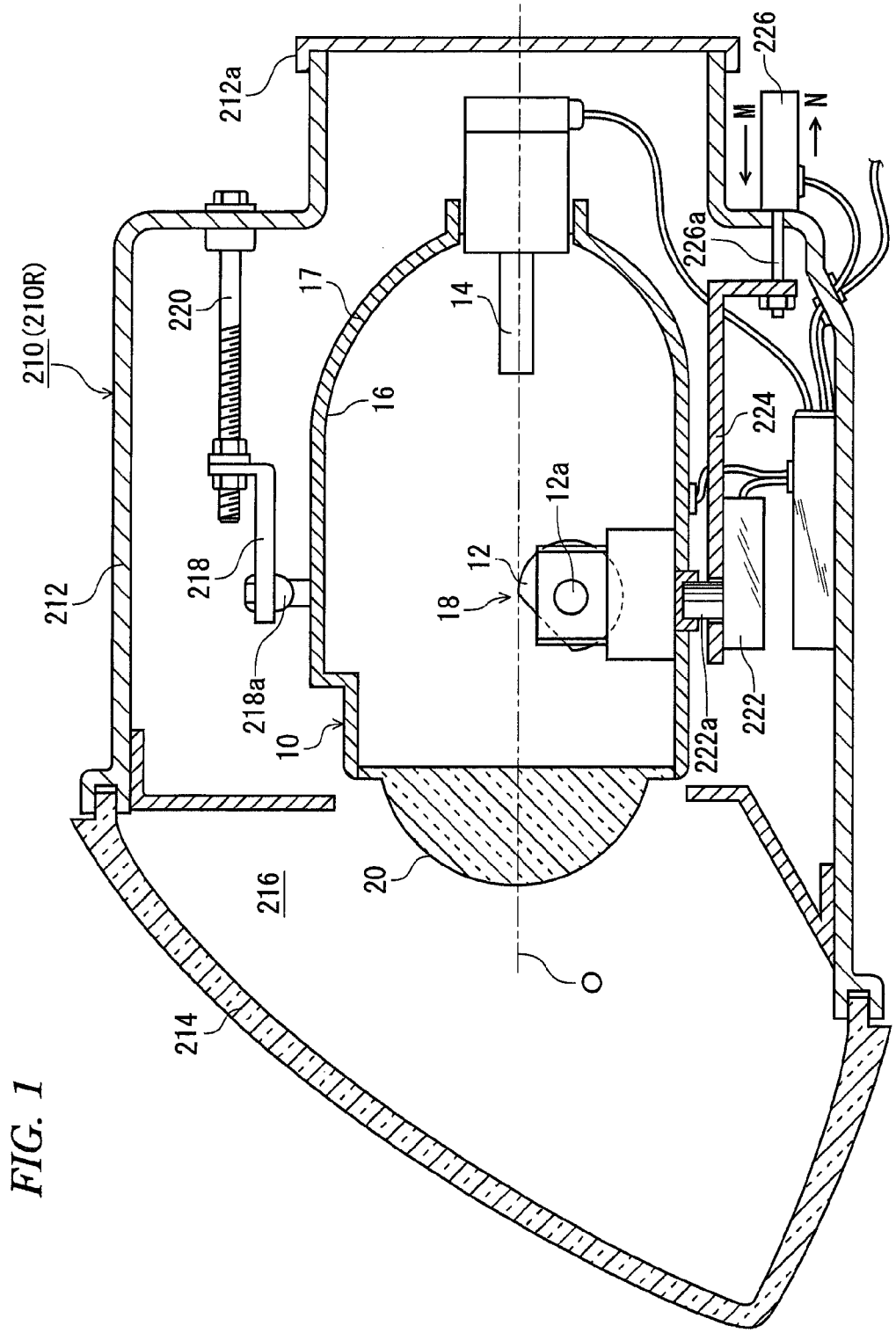
FIG. 1 is a schematic vertical cross-sectional view of a headlight unit including a lamp unit that is to be controlled by a leveling ECU according to a first embodiment.

Preferred embodiments of the invention will be described below with reference to the drawings. The same or equivalent elements, members, and processes, which are shown in the respective drawings, are denoted by the same reference numerals, and repeated description thereof will be appropriately omitted. Further, the embodiments are illustrative and do not limit the invention. The characteristics or combinations described in the embodiments are not necessarily essential in the invention.

(First Embodiment)

FIG. 1 is a schematic vertical cross-sectional view of a headlight unit including a lamp unit that is an object to be controlled by a leveling ECU according to a first embodiment. A pair of headlight units 210, which are symmetrical to each other, are disposed at the left and right portions of a vehicle in a vehicle width direction, respectively. The headlight units, which are disposed at the right and left portions of the vehicle, have substantially the same structure except for their symmetry. Accordingly, the structure of a right headlight unit 210R will be described below, and the description of a left headlight unit 210L will be appropriately omitted.

The headlight unit 210R includes a lamp body 212 and a translucent cover 214. The lamp body 212 includes an opening that is formed at the front portion thereof in the longitudinal direction of the vehicle. The translucent cover 214 covers the opening. The lamp body 212 includes a detachable cover 212a that is provided at the rear portion thereof in the longitudinal direction of the vehicle and can be detached. A lamp chamber 216 is formed by the lamp body 212 and the translucent cover 214. A lamp unit 10 (vehicle lamp), which emits light to the front side of the vehicle, is received in the lamp chamber 216.

A lamp bracket 218, which includes a pivot mechanism 218a serving as a swiveling center of the lamp unit 10 in vertical and horizontal directions, is formed at a part of the lamp unit 10. The lamp bracket 218 is threadably engaged with aiming adjustment screws 220 that are rotatably supported by the wall surface of the lamp body 212. Accordingly, the lamp unit 10 is fixed at a predetermined position in the lamp chamber 216 that is set according to the adjustment states of the aiming adjustment screws 220, and can swivel about the pivot mechanism 218a at that position so that the posture of the lamp unit is changed to a forward inclined posture or a backward inclined posture. Further, a rotating shaft 222a of a swivel actuator 222 is fixed to the lower surface of the lamp unit 10. The swivel actuator 222 is fixed to a unit bracket 224.

A leveling actuator 226, which is disposed outside the lamp body 212, is connected to the unit bracket 224. The leveling actuator 226 is formed of, for example, a motor or the like that pushes and pulls a rod 226a in directions of arrows M and N. When the rod 226a is pushed in the direction of the arrow M, the lamp unit 10 swivels about the pivot mechanism 218a so as to be in the backward inclined posture. In contrast, when the rod 226a is pulled in the direction of the arrow N, the lamp unit 10 swivels about the pivot mechanism 218a so as to be in the forward inclined posture. When the lamp unit 10 is in the backward inclined posture, it is possible to perform leveling adjustment that makes a pitch angle of an optical axis O, that is, an angle of the optical axis O in a vertical direction be directed to the upper side. Further, when the lamp unit 10 is in the forward inclined posture, it is possible to perform leveling adjustment that makes the pitch angle of the optical axis O be directed to the lower side.

The lamp unit 10 may include an aiming adjustment mechanism. For example, an aiming pivot mechanism (not shown), which functions as a swiveling center at the time of aiming adjustment, is disposed at a connection portion between the unit bracket 224 and the rod 226a of the leveling actuator 226. Further, the above-mentioned aiming adjustment screws 220 are disposed at the lamp bracket 218 with a gap therebetween in the vehicle width direction. Furthermore, when the two aiming adjustment screws 220 are rotated, the lamp unit 10 swivels about the aiming pivot mechanism in the vertical and horizontal directions. Accordingly, it is possible to adjust the optical axis O in the vertical and horizontal directions.

The lamp unit 10 includes a shade mechanism 18 including a rotary shade 12, a bulb 14 as a light source, a lamp housing 17 that supports a reflector 16 on the inner wall thereof, and a projection lens 20. For example, an incandescent bulb, a halogen lamp, a discharge bulb, an LED, or the like may be used as the bulb 14. An example where the bulb 14 is formed of a halogen lamp is described in this embodiment. The reflector 16 reflects light that is emitted from the bulb 14. A part of the light emitted from the bulb 14 and the light reflected by the reflector 16 are guided to the projection lens 20 through the rotary shade 12.

The rotary shade 12 is a cylindrical member that is rotatable about a rotating shaft 12a. Moreover, the rotary shade 12 includes a cutout portion that is formed by cutting out a part of the rotary shade in an axial direction, and a plurality of shade plates (not shown). Any one of the cutout portion and the shade plates is moved onto the optical axis O, so that a predetermined light distribution pattern is formed. At least a part of the reflector 16 is formed in an ellipsoidal shape, and the ellipsoidal surface of the reflector is set so that the shape of the cross-section of the ellipsoidal surface, which includes the optical axis O of the lamp unit 10, becomes at least a part of an elliptical shape. The ellipsoidal portion of the reflector 16 has a first focus substantially at the center of the bulb 14, and has a second focus on the rear focal plane of the projection lens 20.

The projection lens 20 is disposed on the optical axis O extending in the longitudinal direction of a vehicle. The bulb 14 is disposed on the rear side of a rear focal plane that is a focal plane including the rear focus of the projection lens 20. The projection lens 20 is formed of a plano-convex aspheric lens of which the front surface is a convex surface and the rear surface is a flat surface. The projection lens projects a light source image, which is formed on the rear focal plane, onto a virtual vertical screen, which is formed in front of the lamp, as an inverted image. Meanwhile, the structure of the lamp unit 10 is not particularly limited thereto, and the lamp unit may be a reflective lamp unit or the like that does not include the projection lens 20.

Figure 2:
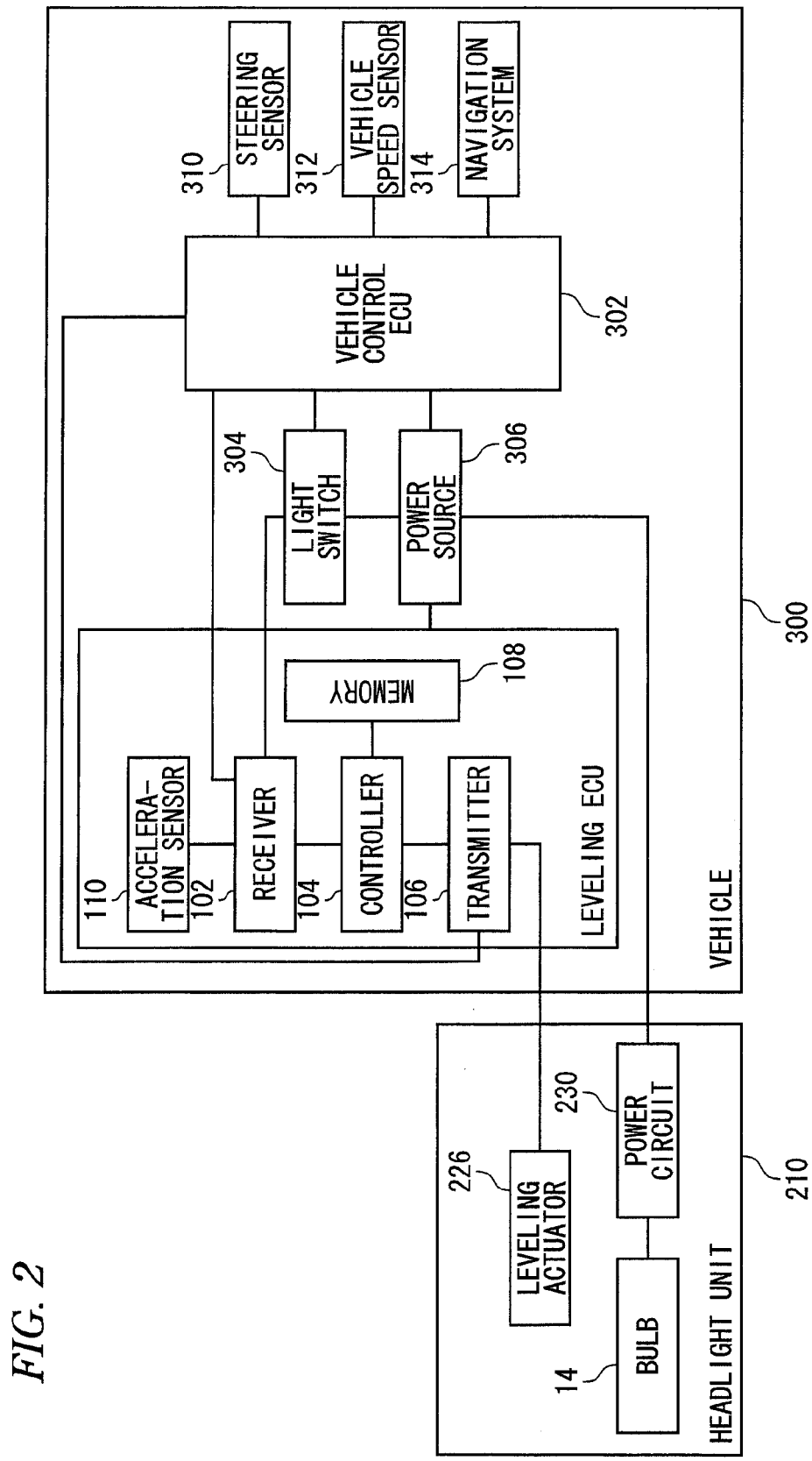
FIG. 2 is a functional block diagram illustrating the operational interaction of the headlight unit, a vehicle control ECU, and the leveling ECU.

FIG. 2 is a functional block diagram illustrating the operational interaction of the headlight unit, a vehicle control ECU, and the leveling ECU. Meanwhile, since the structure of the right headlight unit 210R is basically the same as that of the left headlight unit 210L as described above, the headlight unit 210R and the headlight unit 210L are collectively represented by the headlight unit 210 in FIG. 2. Further, the leveling ECU 100 is realized by an element or a circuit including a CPU or a memory of a computer as hardware structure, and is realized by a computer program or the like as software structure. However, the leveling ECU is shown in FIG. 2 as functional blocks that are realized by the interaction thereof. Accordingly, those skilled in the art understand that these functional blocks may be realized in various ways by the combination of hardware and software.

The leveling ECU 100 (a control device for a vehicle lamp) includes a receiver 102, a controller 104, a transmitter 106, a memory 108, and an acceleration sensor 110. The leveling ECU 100 is installed near, for example, a dashboard of a vehicle 300. Meanwhile, the installation position of the leveling ECU 100 is not particularly limited to the present embodiment. The leveling ECU 100 may be provided in, for example, the headlight unit 210. Further, the acceleration sensor 110 may be provided outside the leveling ECU 100. A light switch 304 and a vehicle control ECU 302 mounted on the vehicle 300 are connected to the leveling ECU 100. Signals, which are output from the vehicle control ECU 302 and the light switch 304, are received by the receiver 102. Further, the receiver 102 receives an output value of the acceleration sensor 110.

Since a steering sensor 310, a vehicle speed sensor 312, a navigation system 314, and the like are connected to the vehicle control ECU 302, the vehicle control ECU 302 can acquire a variety of information from these sensors and the like and transmit the information to the leveling ECU 100 and the like. For example, the vehicle control ECU 302 transmits an output value of the vehicle speed sensor 312 to the leveling ECU 100. Accordingly, the leveling ECU 100 can detect the running state of the vehicle 300.

The light switch 304 transmits a signal that instructs the headlight unit 210 to be turned on/off, a signal that instructs the headlight unit 210 to form a light distribution pattern, a signal that instructs the automatic leveling control to be performed, and the like to a power source 306, the vehicle control ECU 302, the leveling ECU 100, and the like according to the operation of a driver. For example, the light switch 304 transmits a signal, which instructs the automatic leveling control to be performed, to the leveling ECU 100. Accordingly, the leveling ECU 100 starts performing automatic leveling control.

A signal, which is received by the receiver 102, is transmitted to the controller 104. The controller 104 derives the change of an inclination angle of the vehicle 300 on the basis of the information, which is kept in the memory 108, according to needs and the output value of the acceleration sensor 110 transmitted from the receiver 102, and generates an adjustment signal that instructs the optical axis of the lamp unit 10 to be adjusted. The controller 104 outputs the generated adjustment signal to the leveling actuator 226 from the transmitter 106. The leveling actuator 226 is driven on the basis of the received adjustment signal, so that the optical axis O of the lamp unit 10 is adjusted in the vertical direction of the vehicle (the direction of the pitch angle).

The leveling ECU 100, the vehicle control ECU 302, and the power source 306, which supplies power to the headlight unit 210, are mounted on the vehicle 300. When the turning-on of the headlight unit 210 is instructed by the operation of the light switch 304, power is supplied to the bulb 14 from the power source 306 through a power circuit 230.

Figure 3:
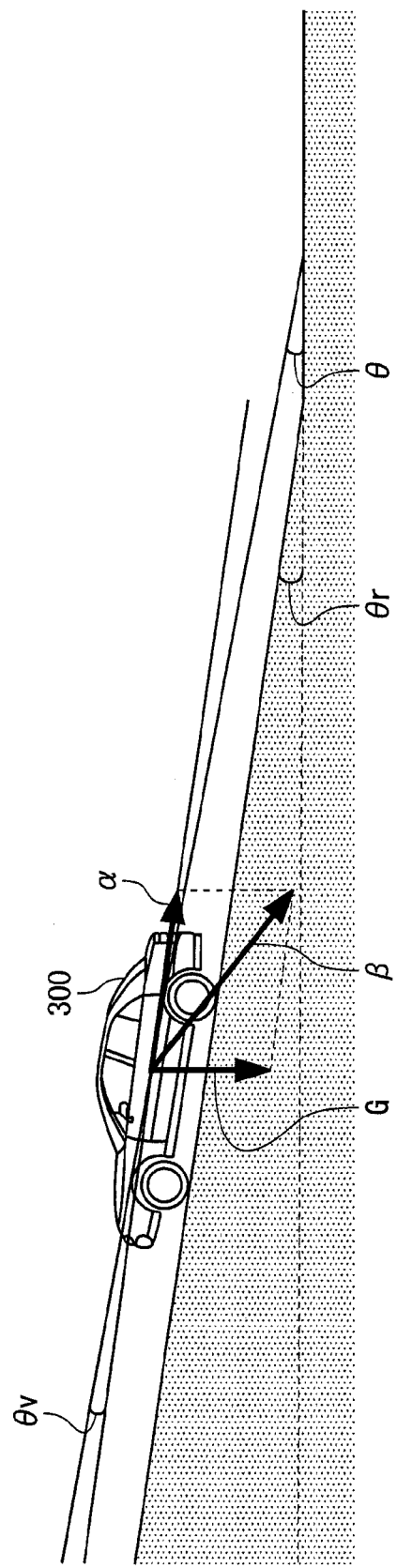
FIG. 3 is a schematic view illustrating an acceleration vector generated at a vehicle and an inclination angle of the vehicle that can be detected by an acceleration sensor.
Figure 4:
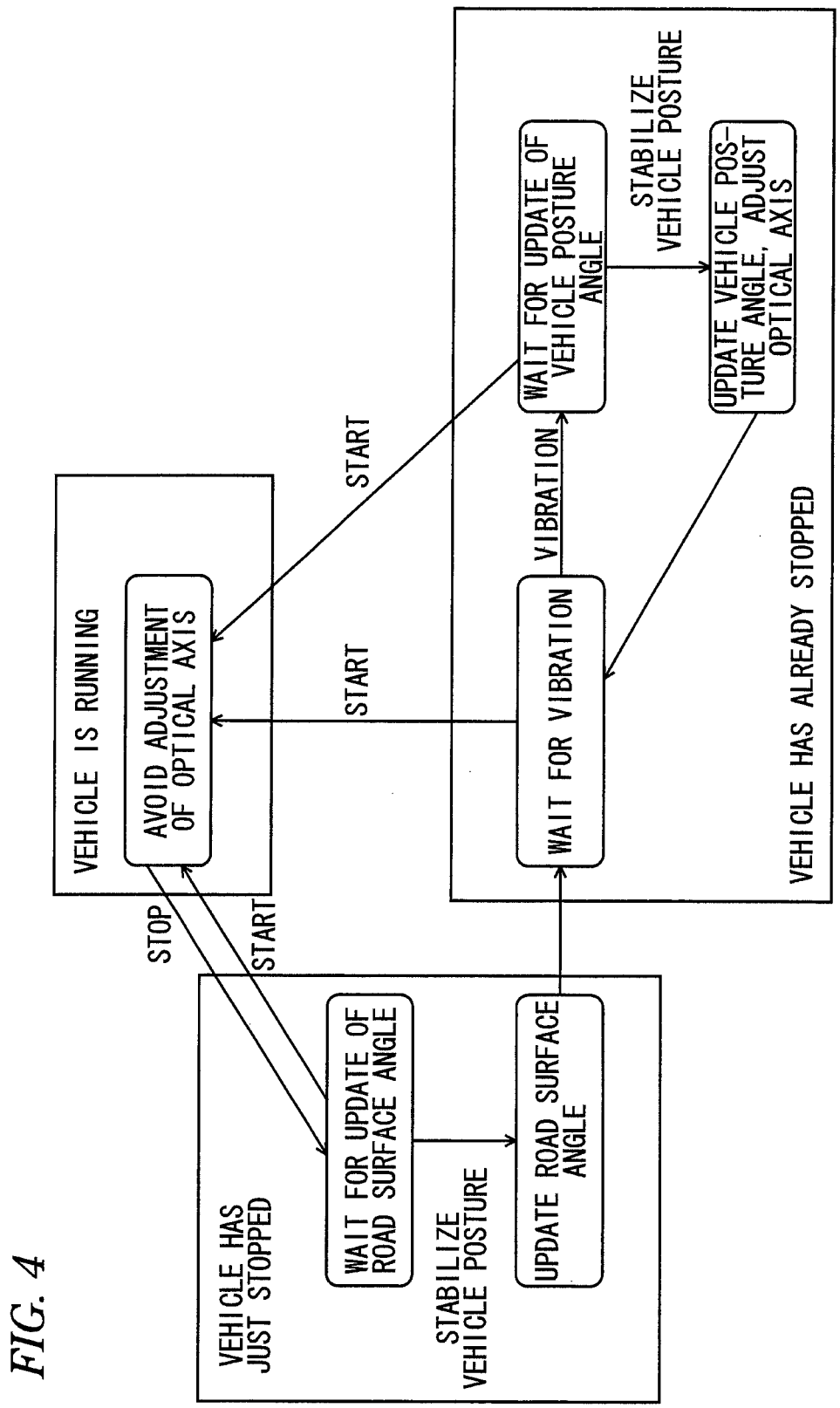
FIG. 4 is a schematic view illustrating automatic leveling control that is performed by the leveling ECU according to the first embodiment.
Figure 5A:
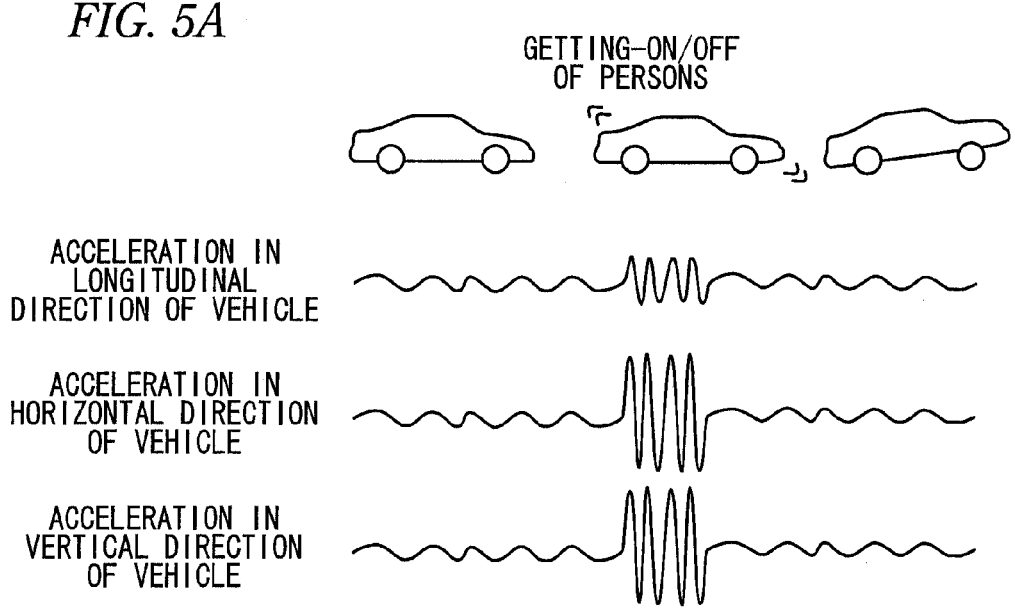
FIG. 5A is a schematic view illustrating the change of the acceleration of the vehicle that is generated by the change of a load.
Figure 5B:
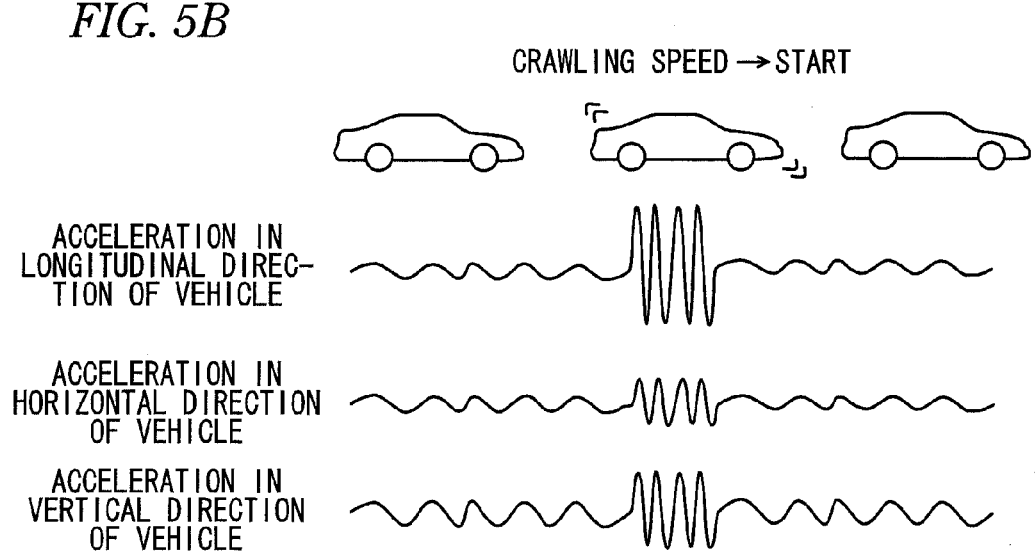
FIG. 5B is a schematic view illustrating the change of the acceleration of the vehicle that is generated by the crawling speed movement of the vehicle.

Subsequently, the automatic leveling control, which is performed by the leveling ECU 100 having the above-mentioned structure, will be described in detail. FIG. 3 is a schematic view illustrating an acceleration vector generated at a vehicle and an inclination angle of the vehicle that can be detected by the acceleration sensor. FIG. 4 is a schematic view illustrating the automatic leveling control that is performed by the leveling ECU according to the first embodiment. FIG. 5A is a schematic view illustrating the change of the acceleration of the vehicle that is generated by the change of a load, and FIG. 5B is a schematic view illustrating the change of the acceleration of the vehicle that is generated by the crawling speed movement of the vehicle.

For example, when luggage is loaded in a luggage compartment formed at the rear portion of the vehicle or occupants are seated in the rear seats of the vehicle, the posture of the vehicle becomes a backward inclined posture. When luggage is unloaded or occupants seated in the rear seats get out of the vehicle, the vehicle is inclined forward from the backward inclined posture. The irradiation direction of the lamp unit 10 is also changed in the vertical direction according to the posture of the vehicle 300, so that the range of light emitted forward increases or decreases. Further, the leveling ECU 100 derives the change of the inclination angle of the vehicle in a pitch direction from the output value of the acceleration sensor 110, and sets the pitch angle of the optical axis O to an angle, which corresponds to the posture of the vehicle, by controlling the leveling actuator 226. Since the automatic leveling control for performing the leveling adjustment of the lamp unit 10 in real time on the basis of the posture of the vehicle is performed as described above, it is possible to adjust the range of light, which is emitted forward, to an optimum distance even though the posture of the vehicle is changed.

Here, the acceleration sensor 110 is, for example, a three-axis acceleration sensor that has an X axis, a Y axis, and a Z axis perpendicular to one another. The acceleration sensor 110 is mounted on the vehicle 300 at an arbitrary posture, and detects an acceleration vector generated at the vehicle 300. Gravity acceleration and motion acceleration caused by the movement of the vehicle 300 are generated at the vehicle 300 that is running. For this reason, as shown in FIG. 3, the acceleration sensor 110 can detect a resultant acceleration vector β of a gravity acceleration vector G and a motion acceleration vector α. Further, during the stop of the vehicle 300, the acceleration sensor 110 can detect the gravity acceleration vector G. The acceleration sensor 110 outputs numerical values of the respective X, Y, and Z-axis components of the detected acceleration vector. The numerical values of the respective X, Y, and Z-axis components, which are output from the acceleration sensor 110, are converted into components of a longitudinal axis, a horizontal axis, and a vertical axis of the vehicle, by the controller 104.

It is possible to derive the inclination of the vehicle 300 with respect to the gravity acceleration vector G from the output value of the acceleration sensor 110 during the stop of the vehicle. That is, from the acceleration detected by the acceleration sensor 110, it is possible to derive the total angle θ that is the inclination angle of the vehicle with respect to the horizontal plane and includes a road surface angle θr (first angle), that is, the inclination angle of a road surface with respect to the horizontal plane and a vehicle posture angle θv (second angle), that is, the inclination angle of the vehicle with respect to the road surface. Meanwhile, each of the road surface angle θr, the vehicle posture angle θv, and the total angle θ is the angle of the longitudinal axis of the vehicle 300 in the vertical direction, that is, the angle of the vehicle 300 in the pitch direction.

An object of the above-mentioned automatic leveling control is to keep the range of light, which is emitted forward, at an optimum distance by absorbing the change of the range of light, which is emitted forward from the vehicle lamp, caused by the change of the inclination angle of the vehicle. Accordingly, the inclination angle of the vehicle, which is required for the automatic leveling control, is the vehicle posture angle θv. For this reason, in the automatic leveling control using the acceleration sensor 110, it is desirable to perform control so that the position of the optical axis of the lamp unit 10 is adjusted when the change of the total angle θ derived from the acceleration detected by the acceleration sensor 110 is caused by the change of the vehicle posture angle θv and the position of the optical axis of the lamp unit 10 is maintained when the change of the total angle θ is caused by the change of the road surface angle θr.

Further, when the total angle θ is changed during the stop of the vehicle, the controller 104 of the leveling ECU 100 performs a control for adjusting the optical axis. When the total angle θ is changed during the running of the vehicle, the controller 104 of the leveling ECU 100 performs a control for avoiding adjusting the optical axis. Since the vehicle posture angle θv is rarely changed during the running of the vehicle by the increase or decrease of the amount of load or the number of persons on the vehicle, it is possible to estimate the change of the total angle θ during the running of the vehicle as the change of the road surface angle θr. Meanwhile, since the road surface angle θr is rarely changed during the stop of the vehicle by the movement of the vehicle 300, it is possible to estimate the change of the total angle θ during the stop of the vehicle as the change of the vehicle posture angle θv.

The controller 104 derives the total angle θ from the acceleration received from the acceleration sensor 110, generates an adjustment signal, which instructs the optical axis to be adjusted with respect to the change of the total angle θ during the stop of the vehicle, and outputs the adjustment signal through the transmitter 106. Meanwhile, the controller 104 avoids outputting the adjustment signal with respect to the change of the total angle θ during the running of the vehicle.

The controller 104 avoids outputting the adjustment signal by not generating the adjustment signal. Alternatively, after generating the adjustment signal, the controller 104 may avoid outputting the generated adjustment signal. Meanwhile, the controller 104 may generate a maintaining signal that instructs the position of the optical axis to be maintained with respect to the change of the total angle θ during the running of the vehicle, and may output the maintaining signal.

Further, the controller 104 outputs an adjustment signal when there is the change of acceleration where the change of a vehicle posture where the optical axis O of the lamp unit 10 is to be adjusted is estimated during the stop of the vehicle. Examples of the change of a vehicle posture where the optical axis O of the lamp unit 10 is to be adjusted may include a change that is caused by the change of a load applied to the vehicle 300 such as the getting-on/off of persons or the loading/unloading of luggage. Meanwhile, examples of the change of a vehicle posture, which is to be excluded from a target for the adjustment of an optical axis, may include a change that is caused by the crawling speed movement of the vehicle stopping immediately after crawling speed start or the extension of a suspension which has sunk at the time of the stop of the vehicle.

The suspension, which sinks due to the deceleration of the vehicle 300 at the time of the stop of the vehicle, gradually extends during the stop of the vehicle (hereinafter, the contraction of the suspension at the time of the stop of the vehicle and the extension of the suspension after the contraction are referred to as the displacement of the suspension). Since the controller 104 determines the change of the total angle θ during the stop of the vehicle as the change of the vehicle posture angle θv and adjusts the optical axis, the contraction of the suspension, which occurs at the time of the stop of the vehicle (that is, during the running of the vehicle), of the displacement of the suspension is not determined as the change of the vehicle posture angle θv. Meanwhile, the extension of the suspension, which occurs during the stop of the vehicle, is treated as the change of the vehicle posture angle θv. Accordingly, if the change of the total angle θ, which is caused by the displacement of the suspension, is used as a target for the adjustment of an optical axis, only the change of the total angle θ caused by the extension of the suspension becomes a target for the adjustment of an optical axis. For this reason, there is a possibility that the position of the optical axis may deviate from a position corresponding to an actual vehicle posture angle θv. Accordingly, the change of a vehicle posture, which is caused by the displacement of the suspension, is to be excluded from a target for the adjustment of an optical axis.

Further, the crawling speed movement of the vehicle accompanies the sinking of the suspension at the time of crawling speed start. The suspension, which sinks at the time of the crawling speed start, does not always return to an original position during the stop of the vehicle, and a part of a contracted portion of the suspension, which contracts due to the crawling speed movement of the vehicle, may extend during the normal running of the vehicle. The extension of the contracted portion of the suspension, which contracts due to the crawling speed movement of the vehicle, during the running of the vehicle is not used as a target for the adjustment of an optical axis. For this reason, if the change of the total angle θ, which is caused by the crawling speed movement of the vehicle, is used as a target for the adjustment of an optical axis, there is a possibility that the position of an optical axis may deviate. Accordingly, the change of a vehicle posture, which is caused by the crawling speed movement of the vehicle, is to be excluded from a target for the adjustment of an optical axis.

Meanwhile, the change of the vehicle speed may not be detected by the vehicle speed sensor 312 in the crawling speed movement of the vehicle. Alternatively, due to the time lag of communication, the controller 104 may not receive a vehicle speed signal from the vehicle speed sensor 312 when receiving acceleration, which is changed due to the crawling speed movement of the vehicle, from the acceleration sensor 110. In these cases, the controller 104 cannot detect that the vehicle 300 starts at a crawling speed and is in a running state. For this reason, the change of a vehicle posture, which is caused by the crawling speed movement of the vehicle, may be included in the change of a vehicle posture during the stop of the vehicle.

Accordingly, it is possible to reduce the deviation of the position of the optical axis, which may occur when the change of a vehicle posture caused by the displacement of the suspension or the crawling speed movement of the vehicle is used as a target for the adjustment of an optical axis, by outputting an adjustment signal when there is the change of acceleration where the change of a vehicle posture where the optical axis O is to be adjusted as described above is estimated.

Further, there is a possibility that a detection error of the acceleration sensor 110, a calculation error of the controller 104, and the like may be included in the change of the total angle θ during the stop of the vehicle. For this reason, it is possible to avoid the increase of the deviation of the position of the optical axis, which may occur when the adjustment of the optical axis is repeated at a predetermined interval during the stop of the vehicle, by outputting an adjustment signal when there is the change of acceleration where the change of a vehicle posture where the optical axis O is to be adjusted is estimated.

Specifically, the controller 104 performs automatic leveling control as shown in FIG. 4. First, the vehicle 300 is placed on the horizontal plane, for example, at a vehicle maker's manufacturing plant, a dealer's maintenance shop, or the like, and this state is referred to as a reference state. The reference state is, for example, a state where one person gets in the driver's seat of the vehicle 300. Further, an initialization signal is transmitted to the leveling ECU 100 by the operation of a switch of an initialization processor, or the like. When receiving the initialization signal through the receiver 102, the controller 104 starts initial aiming adjustment and adjusts the optical axis O of the lamp unit 10 to an initial set position. Furthermore, the controller 104 records the output value of the acceleration sensor 110, when the vehicle 300 is in the reference state, in the memory 108 as the reference value (θr=0°) of the road surface angle θr and the reference value (θ=0°) of the vehicle posture angle θv, so that the controller 104 keeps these reference value.

When the vehicle 300 is actually used, the controller 104 avoids adjusting the optical axis with respect to the change of the total angle θ during the running of the vehicle ("the avoidance of the adjustment of the optical axis" of "during the running of the vehicle" of FIG. 4). It is possible to determine that the vehicle 300 is running by the vehicle speed obtained from, for example, the vehicle speed sensor 312. The "during the running of the vehicle" is the time, for example, until a detected value of the vehicle speed sensor 312 becomes 0 from when a detected value of the vehicle speed sensor 312 exceeds 0. The "during the running of the vehicle" may be appropriately set on the basis of experiments or simulations that are performed by a designer.

Further, the controller 104 obtains the road surface angle θr by subtracting the reference value of the vehicle posture angle θv from the current total angle θ at the time of the stop of the vehicle. Furthermore, the controller 104 keeps the obtained road surface angle θr in the memory 108 as a new reference value. The sentence "when the vehicle has just stopped" is the time where a detected value of the acceleration sensor 110 is stable after, for example, a detected value of the vehicle speed sensor 312 becomes 0. That is, the controller 104 waits for the stabilization of the vehicle posture after the speed of the vehicle 300 becomes 0 ("waiting for the update of the road surface angle" at "the time of the stop of the vehicle" of FIG. 4), and updates the road surface angle θr after the stabilization of the vehicle posture ("the update of the road surface angle" at "the time of the stop of the vehicle" of FIG. 4). The "when the vehicle has just stopped" may be appropriately set on the basis of experiments or simulations that are performed by a designer.

Meanwhile, when a difference between the road surface angle θr, which is calculated at the time of the stop of the vehicle, and the reference value of the road surface angle θr, which is recorded in the memory 108, is equal to or larger than a predetermined value, the controller 104 may update the reference value of the road surface angle θr to the calculated road surface angle θr. According to this, it is possible to avoid frequently rewriting the reference value of the road surface angle θr. Accordingly, it is possible to reduce the control load of the controller 104 and to lengthen the life of the memory 108.

The controller 104 obtains the vehicle posture angle θv by subtracting the reference value of the road surface angle θr from the current total angle θ when there is a change, which exceeds a predetermined threshold, in the acceleration detected by the acceleration sensor 110 during the stop of the vehicle. Moreover, the controller 104 keeps the obtained vehicle posture angle θv in the memory 108 as a new reference value, generates an adjustment signal by using the updated reference value of the vehicle posture angle θv, and outputs the adjustment signal. That is, during the stop of the vehicle, the controller 104 is in a standby state until there is a change (vibration) of acceleration that exceeds a predetermined threshold ("waiting for vibration" of "during the stop of the vehicle" of FIG. 4). If there is vibration, the controller 104 waits for the stabilization of the vehicle posture ("waiting for the update of the vehicle posture angle" of "during the stop of the vehicle" of FIG. 4), and updates the vehicle posture angle θv after the stabilization of the vehicle posture, and adjusts the optical axis of the lamp unit 10 ("the update of the vehicle posture angle and the adjustment of the optical axis" of "during the stop of the vehicle" of FIG. 4). After that, the controller 104 returns to a state waiting for vibration.

It is possible to estimate the change of a vehicle posture, where the optical axis O of the lamp unit 10 is to be adjusted, from the variation of the acceleration detected by the acceleration sensor 110. That is, normally, when there is the change of a load, the vehicle 300 further vibrates as compared to a case where there is the displacement of the suspension or the crawling speed movement of the vehicle. For this reason, acceleration, which is detected by the acceleration sensor 110, is more significantly changed. Accordingly, it is possible to estimate the change of a vehicle posture, where the optical axis O is to be adjusted, by setting a predetermined threshold to the change of acceleration and determining whether or not the change of acceleration exceeds the threshold.

If the change of a vehicle posture caused by the displacement of the suspension or the crawling speed movement of the vehicle is used as a target for the adjustment of an optical axis in the control that updates the reference value of the road surface angle θr by subtracting the vehicle posture angle θv from the total angle θ at the time of the stop of the vehicle and updates the reference value of the vehicle posture angle θv by subtracting the reference value of the road surface angle θr from the total angle θ during the stop of the vehicle, errors are accumulated in the reference values of the road surface angle θr and the vehicle posture angle θv but it is possible to suppress the accumulation of errors by outputting an adjustment signal when there is the change of acceleration where the change of a vehicle posture where the optical axis O is to be adjusted is estimated as described above. Meanwhile, the "predetermined threshold" may be appropriately set on the basis of experiments or simulations that are performed by a designer.

The controller 104 may estimate the change of a vehicle posture, where the optical axis O is to be adjusted, in consideration of the direction of the change of acceleration in addition to the magnitude of the change of acceleration. That is, when there is the change of a load applied to the vehicle 300 during the stop of the vehicle, normally, the vehicle 300 further vibrates in the horizontal direction and the vertical direction as compared to in the longitudinal direction as shown in FIG. 5A. Accordingly, among the accelerations detected by the acceleration sensor 110, the acceleration corresponding to the horizontal direction of the vehicle and the acceleration corresponding to the vertical direction of the vehicle are significantly changed as compared to the acceleration corresponding to the longitudinal direction of the vehicle. Meanwhile, when there is the crawling speed movement of the vehicle, the vehicle 300 further vibrates in the longitudinal direction as compared to in the horizontal direction and the vertical direction as shown in FIG. 5B. Accordingly, among the accelerations detected by the acceleration sensor 110, the acceleration corresponding to the longitudinal direction of the vehicle are significantly changed as compared to the acceleration corresponding to the horizontal direction of the vehicle and the acceleration corresponding to the vertical direction of the vehicle.

Moreover, as understood from the comparison between FIGS. 5A and 5B, when there is the change of a load during the stop of the vehicle, the change of the acceleration corresponding to the longitudinal direction of the vehicle is small and the change of the acceleration corresponding to the horizontal direction of the vehicle and the change of the acceleration corresponding to the vertical direction of the vehicle are large as compared to a case where there is the crawling speed movement of the vehicle. Further, when there is the displacement of a suspension although not shown, the change of acceleration in the longitudinal, horizontal, and vertical directions of the vehicle is small as compared to a case where there is the change of a load.

Further, the controller 104 can estimate the change of a vehicle posture, where the optical axis O is to be adjusted, on the basis of at least one of the acceleration in the longitudinal direction of the vehicle, the acceleration in the horizontal direction, and the acceleration in the vertical direction that are derived from the acceleration detected by the acceleration sensor 110. For example, the controller 104 sets a predetermined threshold to at least one of these three accelerations, and can estimate the change of a vehicle posture, where the optical axis O is to be adjusted, by determining whether or not the change of acceleration exceeds the predetermined threshold.

Since the direction of the change of acceleration is considered in addition to the magnitude of the change of acceleration as described above, it is possible to estimate the change of a vehicle posture, where the optical axis O is to be adjusted, with a higher accuracy. Meanwhile, the change of a load applied to the vehicle 300 significantly differs from the crawling speed movement of the vehicle in terms of acceleration in the longitudinal direction of the vehicle. For this reason, it is possible to distinguish the change of a load from the crawling speed movement of the vehicle with a higher accuracy by estimating the change of a vehicle posture, where the optical axis O is to be adjusted, on the basis of the change of acceleration in the longitudinal direction and the change of acceleration in the horizontal or vertical direction. Accordingly, it is possible to estimate the change of a vehicle posture, where the optical axis O is to be adjusted, with a higher accuracy. Further, the change of a vehicle posture, where the optical axis O of the lamp unit 10 is to be adjusted, may be estimated by frequency analysis using FFT (Fast Fourier Transform).

Meanwhile, when a difference between the calculated vehicle posture angle θv and the reference value of the vehicle posture angle θv recorded in the memory 108 is equal to or larger than a predetermined value, the controller 104 may update the reference value of the vehicle posture angle θv to the calculated vehicle posture angle θv and adjust the optical axis. According to this, it is possible to avoid frequently rewriting the reference value of the vehicle posture angle θv and frequently adjusting the optical axis. Accordingly, it is possible to reduce the control load of the controller 104 and to lengthen the life of the memory 108 and the life of the leveling actuator 226. The "during the stop of the vehicle (when the vehicle has already stopped)" is the time, for example, until the time of the start of the vehicle from the stabilization of a detected value of the acceleration sensor 110, and the "time of the start of the vehicle" is the time where, for example, a detected value of the vehicle speed sensor 312 exceeds 0. The "during the stop of the vehicle" may be appropriately set on the basis of experiments or simulations that are performed by a designer.

Figure 6:
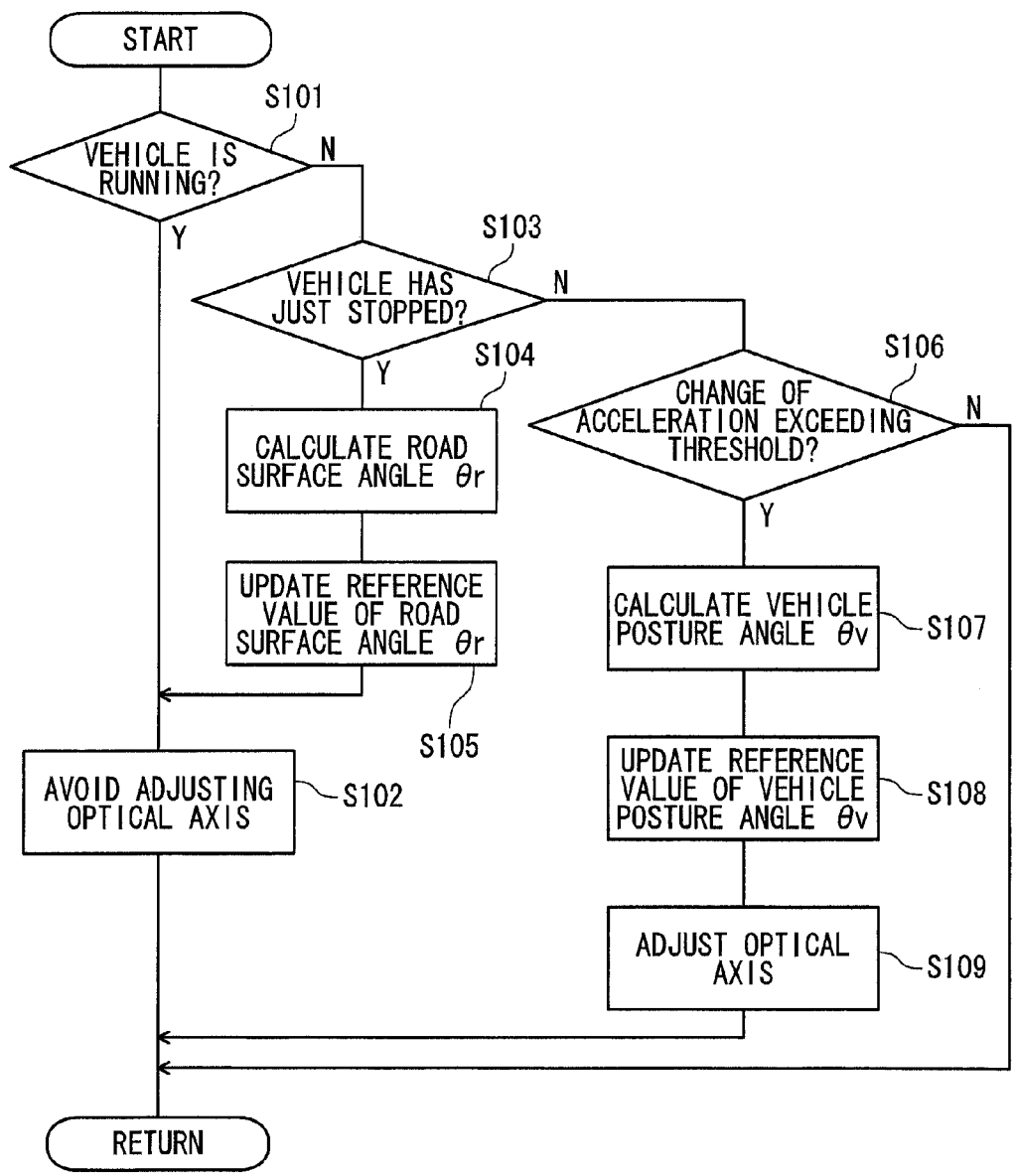
FIG. 6 is a flowchart of the automatic leveling control that is performed by the leveling ECU according to the first embodiment.

FIG. 6 is a flowchart of the automatic leveling control that is performed by the leveling ECU according to the first embodiment. In the flowchart of FIG. 6, a procedure of each part is shown by the combination of S (initial of Step) meaning a step and numerals. While an automatic leveling control mode is instructed by, for example, the light switch 304, this flow is repeatedly performed at a predetermined timing by the controller 104 when ignition is turned on and this flow is ended when ignition is turned off.

First, the controller 104 determines whether or not the vehicle is running (S101). If the vehicle is running (Y in S101), the controller 104 avoids adjusting the optical axis (S102) and ends this routine. If the vehicle is not running (N in S101), the controller 104 determines whether the vehicle has just stopped (S103). If the vehicle has just stopped (Y in S103), the controller 104 calculates the road surface angle θr by subtracting the reference value of the vehicle posture angle θv from the current total angle θ (S104) and updates the calculated road surface angle θr as a new reference value (S105). After that, the controller 104 avoids adjusting the optical axis (S102) and ends this routine.

If the vehicle has not just stopped (N in S103), this case means that the vehicle has already stopped. Accordingly, the controller 104 determines whether or not there is the change of acceleration exceeding a threshold (S106). If there is no change of acceleration exceeding the threshold (N in S106), the controller 104 ends this routine. If there is the change of acceleration exceeding the threshold (Y in S106), the controller 104 calculates the vehicle posture angle θv by subtracting the reference value of the road surface angle θr from the current total angle θ (S107) and updates the calculated vehicle posture angle θv as a new reference value (S108). Further, the controller 104 adjusts the optical axis on the basis of the reference value of the updated vehicle posture angle θv (S109), and ends this routine.

As described above, when there is the change of acceleration where the change of a vehicle posture where the optical axis O of the lamp unit 10 is to be adjusted is estimated, the leveling ECU 100 according to this embodiment adjusts the optical axis during the stop of the vehicle and avoids adjusting the optical axis during the running of the vehicle. Accordingly, it is possible to reduce the deviation of the position of the optical axis, which may occur when the change of a vehicle posture caused by the displacement of the suspension or the crawling speed movement of the vehicle is used as a target for the adjustment of an optical axis. For this reason, it is possible to improve the accuracy of the automatic leveling control that adjusts the optical axis of the vehicle lamp 10 by the acceleration sensor 110.

Meanwhile, the above-mentioned leveling ECU 100 is an aspect of the invention. The leveling ECU 100 includes the receiver 102 that receives the acceleration detected by the acceleration sensor 110, and the controller 104 that performs the above-mentioned automatic leveling control.

Examples of another aspect of the invention may include a vehicle lamp system. The vehicle lamp system includes the lamp unit 10, the acceleration sensor 110, and the leveling ECU 100 (in first embodiment, the acceleration sensor 110 is included in the leveling ECU 100).

While aspects of embodiments of the present invention have been shown and described above, other implementations are within the scope of the claims. It will be understood by those skilled in the art that various changes in form and details may be made therein without departing from the spirit and scope of the invention as defined by the appended claims.

What is claimed is:

1. A control device for controlling a vehicle lamp provided in a vehicle, the device comprising:
a receiver configured to receive an acceleration signal representing an acceleration of the vehicle, from an acceleration sensor configured to detect the acceleration of the vehicle, wherein an inclination angle of the vehicle with respect to a horizontal plane is calculated based on the acceleration signal;
a controller configured to:
i) generate a first control signal instructing the vehicle lamp to adjust an optical axis of the vehicle lamp in response to a change of the acceleration signal, when the vehicle is stopped; and
ii) generate a second signal instructing the vehicle lamp to maintain the optical axis of the vehicle lamp, when the vehicle is traveling on a road surface,
wherein the inclination angle comprises:
a first angle that represents an inclination angle of the road surface with respect to the horizontal plane; and
a second angle that represents an inclination angle of the vehicle with respect to the road surface,
wherein the controller is configured to save the first angle as a first reference value and the second angle as a second reference value,
wherein if the change in the acceleration is greater than a threshold value when the vehicle is stopped, the controller calculates a new second reference value based on the first reference value and the inclination angle, saves the new second reference value and generates the first control signal, and
wherein when the vehicle has just stopped after traveling on the road surface, at a time where a detected value of the acceleration sensor is stable, the controller calculates a new first reference value based on the second reference value and the inclination angle and saves the new first reference value.

2. The device of claim 1, wherein the controller is configured to generate the first control signal in response to the change of the acceleration signal in at least one of a longitudinal direction, a horizontal direction and a vertical direction of the vehicle.

3. The device of claim 2, wherein the controller is configured to generate the first control signal in response to the change of the acceleration signal in the longitudinal direction and the change of the acceleration signal in the horizontal direction or the vertical direction.

4. A vehicle lamp system comprising:
a vehicle lamp provided in a vehicle and configured to adjust an optical axis thereof;
an acceleration sensor configured to detect the acceleration of the vehicle; and
a control device configured to control the vehicle lamp, the device comprising:
a receiver configured to receive an acceleration signal representing an acceleration of the vehicle, from the acceleration sensor, wherein an inclination angle ($\theta$) of the vehicle with respect to a horizontal plane is calculated based on the acceleration signal;
a controller configured to:
i) generate a first control signal instructing the vehicle lamp to adjust the optical axis of the vehicle lamp in response to a change of the acceleration signal, when the vehicle is stopped; and
ii) generate a second signal instructing the vehicle lamp to maintain the optical axis of the vehicle lamp, when the vehicle is traveling on a road surface, wherein the inclination angle comprises: a first angle that represents an inclination angle of the road surface with respect to the horizontal plane; and a second angle that represents an inclination angle of the vehicle with respect to the road surface, wherein the controller is configured to save the first angle as a first reference value and the second angle as a second reference value, wherein if the change in acceleration is greater than a threshold value when the vehicle is stopped, the controller calculates a new second reference value based on the first reference value and the inclination angle, save the new second reference value and generates the first control signal, and wherein when the vehicle has just stopped after traveling on the road surface, at a time where a detected value of the acceleration sensor is stable, the controller calculates a new first reference value based on the second reference value and the inclination angle and saves the new first reference value.

* * * * *